Aug. 13, 1957  F. W. THOMAS  2,802,240
METHOD OF MAKING CELLULAR PLASTIC ARTICLES
Filed Oct. 26, 1951
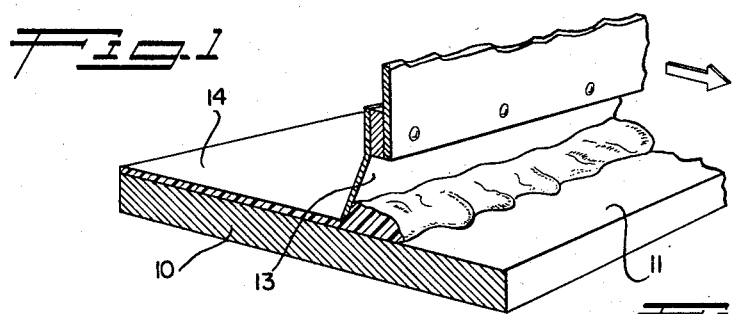
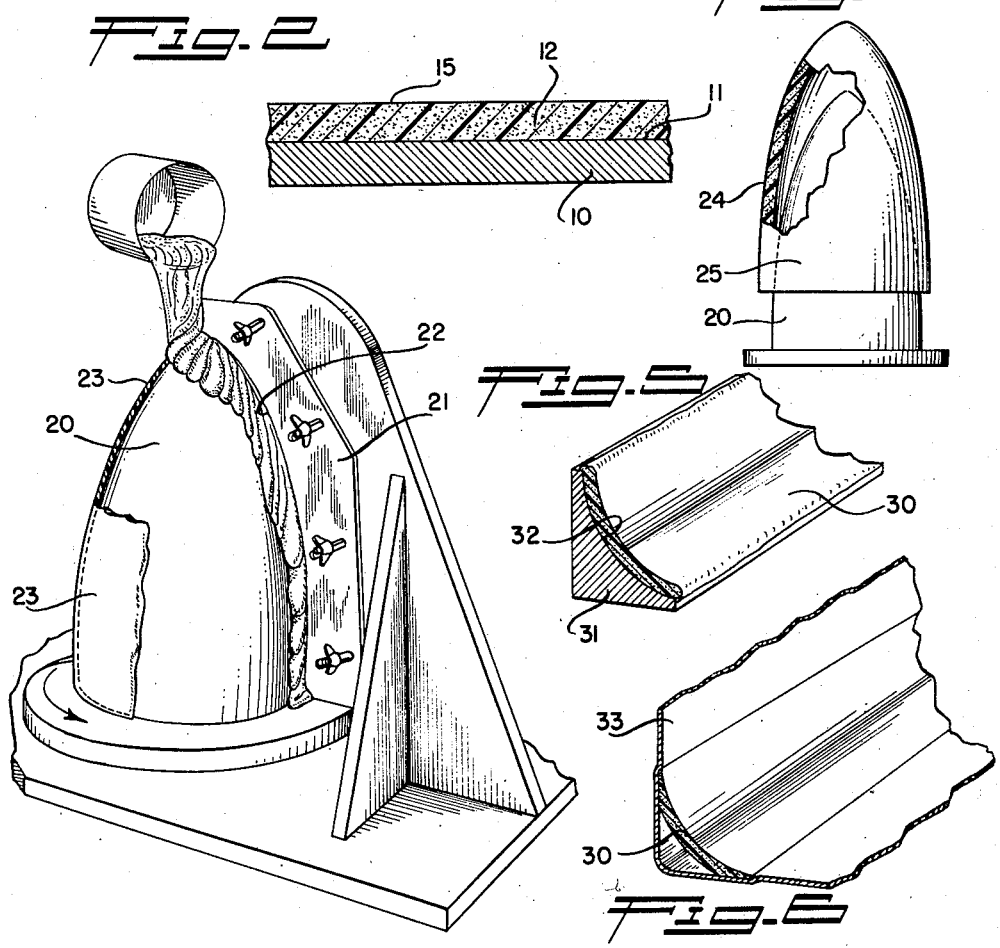
INVENTOR.
FRANK W. THOMAS
BY
*George C. Sullivan*
Agent United States Patent Office 2,802,240
Patented Aug. 13, 1957

2,802,240

METHOD OF MAKING CELLULAR PLASTIC ARTICLES

Frank W. Thomas, Burbank, Calif., assignor to Lockheed Aircraft Corporation, Burbank, Calif.

Application October 26, 1951, Serial No. 253,415

3 Claims. (Cl. 18—48)

This invention relates to the method of making articles of manufacture and relates more particularly to a method for manufacturing fairings, and the like, for use on aircraft.

The present invention is concerned with the method of manufacture of fairings such as fillets, rocket pod nose sections, etc. for aircraft as well as other articles and objects constructed of foamaceous or cellular plastics. It is one general object of the invention to provide an extremely simple, rapid and inexpensive process or method for making such objects and articles.

It is another object of my invention to provide such a process or method which requires the use of only one die or form and wherein the plastic in a liquid or semi-liquid state is applied to or spread on the die to thereafter foam to its final contour and to take on or develop a substantially smooth continuous uniform ceramic-glaze-like external surface. The reactant plastic mixture is applied to the outer surface of the single die to an initial and usual uniform thickness, and thereafter foams up to a considerably greater thickness and at the same time, or upon setting, develops an external surface that is smooth and glaze-like so that upon removal from the die it constitutes an article or product having the contour of the die, having a smooth inner surface acquired from the surface of the die, and a smooth glazed outer surface resulting from the foaming action and setting and curing of the plastic composition. A minimum of tooling is required performing this method, the tooling in specific cases consisting of a single die and any appropriate means such as a blade for spreading or distributing the plastic material layer on the die.

Another object of the invention is to provide a method for making cellular plastic articles or objects characterized by the provision of the hard smooth glazed external surface on the product or article, which protects the internal cellular matrix, strengthens the product, and forms an attractive surface, whether painted or unpainted. This external surface, obtained by employing the method of the invention, differs from a surface that is obtained at the face or surface of a die, being more attractive in appearance, and different in kind, and as above noted, is obtained without the need for a second or outer die.

Other features and objetives will become apparent from the following detailed description of several manners of practicing the invention and of the articles produced thereby, throughout which description reference will be made to the accompanying drawings wherein:

Figure 1 is a fragmentary perspective view, illustrating one manner of applying a layer or coating of the plastic material to a surface or die;

Figure 2 is a fragmentary vertical sectional view of the part or article produced by the equipment illustrated in Figure 1, the cellular plastic part being on the under member or die plate;

Figure 3 is a perspective view illustrating the manner of applying the liquid or semi-liquid plastic material to a male die and of spreading the same on the die, with a portion of the applied material appearing in vertical cross section;

Figure 4 is a reduced side elevation of the die and article illustrated in Figure 3 showing the foamed plastic product or article being removed from the die with a portion of the article appearing in vertical cross section;

Figure 5 is a fragmentary perspective view of a foamed or cellular plastic product or article such as a molding, fillet or fairing on its die; and Figure 6 is a fragmentary perspective view showing the finished or completed product of Figure 5 in position on another structure.

The methods of this invention are adapted to be employed in the production or manufacture of articles and devices of various kinds. For example, the invention may be used to provide plywood, wallboard, insulation sheets, paper, cardboard, sheet metal, etc. with coatings of cellular plastic for thermal insulation, acoustical insulation, or sound proofing, packaging purposes and/or ornamental uses. The methods are also useful in making various types and forms of articles such as floats, life belts, insulating sleeves or parts for steam pipes, etc. fairings and other parts for use in aircraft and other light weight structural or ornamental parts and articles. In the following detailed description reference will be made to the typical methods and articles illustrated in the accompanying drawings, it being understood that these are not to be construed as limiting the scope or application of the invention.

In Figure 1, I have illustrated a manner of carrying out the invention in the production of a flat sheet, strip or object of cellular plastic or in providing a layer or coating of cellular plastic on a flat member such as a member of wallboard, plywood, cardboard, fibreboard, paper, sheet metal, or the like. The reference numeral 10 designates a flat or relatively flat plate or sheet-like member which may be either considered a die or a base or backing on which a layer of the cellular plastic is to be provided. The member 10 has a flat surface 11 which may either constitute the die surface on which the sheet, strip or article 12 of cellular plastic is shaped or formed, or the surface 11 may be finally and permanently adhered to by the layer 12 of the cellular plastic, in which case the final product includes the backing member 10 and the surface layer 12 of cellular relatively low density but high strength plastic. In the former case, where the surface 11 forms a die face, it is preferably prepared to insure the proper free release of the product or part 12 after the same has set and cured. Where the member 10 is in the nature of a die, it may be formed of plaster of Paris, aluminum, other metal or alloy, or the like, and its surface 11 is preferably finished or machined to have a smooth and preferably mirror-like finish. Additionally, a release agent system is preferably provided on the surface 11 to facilitate the free release of the product or cellular plastic part 12 from the die member 10. Such a system may include an alkyl polymeric silicone release compound thoroughly rubbed into the surface 11 followed by a film of from 5 to 8 mils of polyvinyl chloride lacquer, or the equivalent, sprayed or otherwise provided on the silicone film. This method of treating the surface 11 provides it with a barrier or parting coating which prevents the adhesion of the phenolic resin foam to the die 10. Of course where the part 12 is to be in the nature of a layer, or coating on the backing member 10, the surface 11 need not be provided with the parting or release coating, just described, and it is usually only necessary to clean the surface of 11 to assure the uniform adhesion of the phenolic resin to the member 10, the phenolic foam compound having the ability to adhere effectively to practically all solid materials such as metals, wood, paper, fibre, etc.

In accordance with the invention the article or layer 12 may be of any selected cellular phenolic resin composition, or the equivalent, that is adapted to be applied to the member 10 in a liquid or semi-liquid state and to thereafter foam up and set and cure with a smooth continuous and substantially uniform outer surface and with a cellular relatively low density and high strength internal matrix. It is preferred to employ phenolic resin formulations of the kind described and claimed in the application of Frank W. Thomas and Eli Simon, Serial No. 231,673, filed July 11, 1951, for producing or providing the layer or article 12. In a typical preferred formulation of this kind the phenolic resin employed, which I will designate resin No. 1, may be prepared from:

| | Mols |
|---|---|
| Phenol | 1 |
| A 35% to 37% by weight aqueous formaldehyde solution | 1 to 2½ |
| Barium hydroxide 8H₂O | .003 to .020 |

The following are three typical foaming phenolic resin formulations of the kind mentioned above:

*Formula A*

| | Grams |
|---|---|
| Phenolic resin No. 1 | 60 |
| Polyvinyl alcohol | 8 |
| Aluminum leafing powder (of approximately 400 mesh) | 0.25 |
| Catalyst | 5 |

*Formula B*

| | Grams |
|---|---|
| Phenolic resin No. 1 | 60 |
| Polyvinyl alcohol | 3 |
| Aluminum leafing powder (400 mesh) | 0.25 |
| Furfural-formaldehyde ¹ | 1 |
| Catalyst | 5 |

¹ The furfural being in the proportion of from 5 to 50% by mol weight.

*Formula C*

| | Grams |
|---|---|
| Phenolic resin No. 1 | 60 |
| Polyvinyl alcohol | 2 |
| Aluminum leafing powder (400 mesh) | 0.25 |
| Furfural-formaldehyde ¹ | 1 |
| Catalyst | 5 |

¹ The furfural being in the proportion of from 5 to 50% by mol weight.

The catalyst of these formulations may include on a percentage by weight basis:

| | |
|---|---|
| Benzene sulphonic acid (a 77% aqueous solution) | 26.2 |
| Orthophosphoric acid (an 85% by weight concentration in an aqueous solution) | 48.2 |
| Water | 25.6 |

In these formulations the aluminum powder, or its equivalent, forms the gassing agent which, when catalyzed by or reacted with the catalyst liberates a gas to form the cells of the foamed or cellular plastic. To prepare the reactant mixture, which is to constitute the cellular plastic layer or part 12, the resin, the gassing agent and the polyvinyl alcohol or furfural-formaldehyde, are thoroughly mixed together to form one component or package, and the ingredients of the catalyst are mixed together to form a second component or package. When the layer, or part 12, is to be made, these two components or packages are mixed together to form the reactant mixture which is a liquid or semi-liquid capable of being poured, bladed, brushed, etc.

In carrying out the method, as illustrated in Figure 1, the reactant phenolic resin-catalyst mixture, just described, is applied to the surface 11 of the die or member 10 which may have been treated, or not, as previously described. A suitable quantity of the mixture may be poured on the surface 11, applied by a blade, dipped on, or otherwise applied. After the selected quantity of the reactant mixture has been deposited on the surface 11 it is distributed thereover to constitute a layer or film of uniform thickness. As shown in Figure 1, a blade 13 is moved parallel with the surface 11 to spread the liquid mixture out in the form of a uniformly distributed film 14. The thickness of this resultant film 14 of liquid reactant mixture will, of course, depend upon the amount of rise of the particular reactant mixture and the intended thickness of the final layer or part 12. Thus, for example, when the layer or part 12 is to be approximately ¼ to ¾ inch thick and Formula A is used, the film 14 may be approximately .050 to .100 inch thick. When the film 14 has been applied it is allowed to air cure at room temperature for from 15 to 30 minutes, depending upon the ambient temperature. The die or member 10 carrying the reactant film 14 is then transferred to a uniformly heated oven having a temperature of from 100° to 200° F. and preferably 150° F. The work is allowed to remain in the oven at this temperature for from 1 to 2 hours to obtain the final cure. During the initial air cure and the final oven cure the reactant film 14 increases materially in volume by reason of the foaming reaction and its thickness in a typical case would increase from .050 to .100 inch to ¼ to ¾ inch. The reaction converts the liquid film 14 to a cellular plastic matrix having uniformly distributed cells and having considerable physical strength. At the same time, a smooth, substantially uniform and unbroken ceramic-glaze-like surface 15 forms on the cellular plastic layer or part 12. The rise of the reactant mixture during the cure is substantially uniform so that this surface 15 is parallel with the surface 11 of the die or member 10. In fact, where the surface 11 is flat, as illustrated, the surface 15 of the final or finished part 12 will likewise be flat and substantially parallel with the surface 11. Thus a "finished" smooth and attractive appearing surface 15 is formed or provided on the cellular plastic layer or part 12 without the need for applying a second or upper die. Where the surface 15 is to remain unpainted and the product is to be used where its appearance is of importance, practically any selected dye or pigment may be incorporated in the phenolic resin mixture to give the surface 15 the desired color. Where the surface 11 of the die 10 has been treated with a parting preparation, the completed part 12 may be readily removed from the die 10 and the surface 11 again prepared for the manufacture of the next article or part. However, where the part 12 is to constitute a layer on the member 10, it of course remains on the surface 11 and permanently and strongly adheres thereto, the reactant phenolic mixture having the ability to effectively and permanently adhere to practically all solid materials.

Figure 3 illustrates a manner of practicing the invention to produce a rocked pod nose, or the like, of hollow conoidal configuration. In this case a die 20 having an external configuration the same as but somewhat smaller in dimensions than the external configuration of the intended part or product 24 is provided and its surface is finished and prepared to permit the free parting or release of the product after the cure of the same. The surface of the die 20 may be prepared in the same manner as the surface 11 above described, that is it is machined and buffed to have a mirror-like surface, then rubbed with silicon release compound and then provided with a vinyl lacquer coating. A blade 21 is provided adjacent the die 20 and the two are related for relative rotation about the longitudinal axis of the die. Thus it may be assumed that the die 20 is rotatable about its longitudinal axis, as indicated by the arrow in Figure 3, and the blade 21 is stationary. The blade 21 lies in a plane that is substantially radial relative to the die 20 and its inner edge 22 is parallel with the surface of the die. In cases where the wall thickness of the final product 24 is to be graduated or varied in any way, the edge 22 of the blade is correspondingly shaped. Furthermore, the blade 21 may be arranged so that its edge 22 may be adjusted radially relative to the surface of the die 20 to facilitate the production of parts of different or selected thicknesses.

In carrying out the method, the reactant phenolic resin mixture is prepared, as above described, and a suitable quantity of the mixture is poured, or otherwise applied, to the die 20. As illustrated in Figure 3, where the die 20 is vertically disposed, the mixture is preferably poured on its upper portion. The die 20 is then rotated relative to the blade 21 so that the blade operates to spread a relatively thin uniform film 23 of the reactant mixture on the surface of the die. It will be seen that the spacing of the blade edge 22 from the die 20 determines the thickness of this film and the blade 21 may be adjusted to alter this spacing as desired. The die 20 may be rotated several times to assure the uniform and complete distribution of the reactant mixture over its surface and, if desired or believed necessary, the die may be inclined during this action to assist in obtaining the uniform film 23. When a film 23 of the selected thickness has been provided on the surface of the die 20, the die and the blade 21 are separated and the reactant film 23 is allowed to air cure at room temperature for from 15 to 30 minutes, depending upon the ambient temperature. The die 20, carrying the rising reactant film 23, is then transferred to an oven having a temperature of about 150° F. and allowed to remain in the oven for from 1 to 2 hours to effect a final cure of the cellular phenolic resin product.

During its reaction and curing, the reactant phenolic resin mixture of the relatively thin film 23 foams up and becomes cellular, increasing greatly in volume so that the wall thickness of the product or article 24 is much greater than the thickness of the film 23. This increase in thickness of the layer of phenolic resin mixture is uniform and is accompanied by the formation of a smooth uniform and continuous surface 25 on the exterior of the part 24. The smooth glazed surface 25 is concentric or parallel with the surface of the die 20 and covers or encases the cellular low density matrix or core of the part 24. Thus a conoidal part 24 is easily and quickly produced to the desired shape and dimensions and with a smooth, uniform surface by employing only one die 20, no external or outer die being necessary. The part 24 is readily released from the die 20 and removed for use, the surface 25 of the die thus being made available for the production of the next part when properly prepared, as above described. The surface 25 of the part 24 may be painted or finished as desired or any selected pigment or dye may be incorporated in the reactant phenolic resin mixture to give the part or product the desired color.

In Figures 5 and 6 there is illustrated a product or part 30 of the invention in the nature of a fillet, molding, or the like, produced on a single die. Figure 5 shows the die 31 having an elongate concave surface 32 on which the part 30 is formed. This surface 32 is prepared in the same manner as the surface 11 to permit easy release or parting of the finished object 30. The liquid reactant mixture, prepared as previously described, is applied to the surface 32 and is spread or distributed over the surface by blading, brushing, or the like. The reactant film is allowed to air cure and is then subjected to oven curing in the same manner as the film 14. The mixture foams up to give the part 30 the required thickness and a smooth continuous surface forms on the part to be parallel or concentric with the face of the die. After the part 30 has been removed from the die 31 its edges may be trimmed or machined off so that it may be assembled in the corner of a structural or surfacing member 33, as illustrated in Figure 6.

From the foregoing detailed description it will be seen that I have provided a method for quickly and inexpensively producing cellular plastic parts of various kinds, having a unique smooth and continuous external surface. This surface follows the contour of the single die that is utilized in the process and because of the formation and character of this surface and the uniform rise of the cellular phenolic resin, the use of a second or outer die is wholly unnecessary. This greatly simplifies the procedure and materially reduces the cost of manufacture.

Having described only typical preferred embodiments and applications of the invention, I do not wish to be limited to the specific details set forth, but wish to reserve to myself any features or modifications that may fall within the scope of the following claims.

I claim:

1. The method of making a cellular plastic article which comprises applying a liquid reactant mixture of phenol formaldehyde resin containing a divided metal gassing agent, approximately 11% polyvinyl alcohol and an aromatic sulfonic-phosphoric acid aqueous solution catalyst reacting with said agent to render the mixture cellular, to the surface of a die so that the layer has an inner surface on the die and an unconfined external surface, distributing said liquid layer evenly, uniformally and smoothly on said die by means of a blade, so that the thickness of said liquid layer is substantially less than the desired thickness of the finished plastic article, air curing said liquid layer at room temperature for from 15 to 30 minutes, oven curing at a temperature of about 150° F. from 1 to 2 hours while simultaneously permitting said curing layer to expand perpendicularly from said die surface to the desired thickness of the finished plastic article as determined by the thickness of said liquid layer, whereby the layer sets to form a plastic article having a continuous external hard glossy surface substantially parallel to the surface of said die.

2. The method of making a cellular plastic article as in claim 1 and wherein a portion of the percentage of of the die by pouring.

3. The method of making a cellular plastic article as in claim 1 and wherein a portion of the precentage of polyvinyl alcohol is replaced by furfural formaldehyde.

References Cited in the file of this patent

UNITED STATES PATENTS

| | | |
|---|---|---|
| 1,133,083 | Baekeland | Mar. 23, 1915 |
| 1,200,692 | Baekeland | Oct. 10, 1916 |
| 1,699,727 | Weith | Jan. 22, 1929 |
| 1,776,366 | Novotny | Sept. 23, 1930 |
| 1,917,413 | Wirth | July 11, 1933 |
| 2,071,365 | Stroop | Feb. 23, 1937 |
| 2,145,731 | Minor | Jan. 31, 1939 |
| 2,325,903 | Blair | Aug. 3, 1943 |
| 2,354,260 | Haney | July 25, 1944 |
| 2,356,380 | Chollar | Aug. 22, 1944 |
| 2,376,653 | Boyer | May 22, 1945 |
| 2,525,966 | Smith | Oct. 17, 1950 |
| 2,582,228 | Brinkema | Jan. 15, 1952 |